Nov. 7, 1950  L. F. GOODRICH  2,528,509
MOLD CHARGING APPARATUS
Filed March 7, 1947  3 Sheets-Sheet 1

Inventor
LEVI F. GOODRICH
By Knight & Fowler
Attorneys

Nov. 7, 1950        L. F. GOODRICH        2,528,509
MOLD CHARGING APPARATUS
Filed March 7, 1947                 3 Sheets—Sheet 2
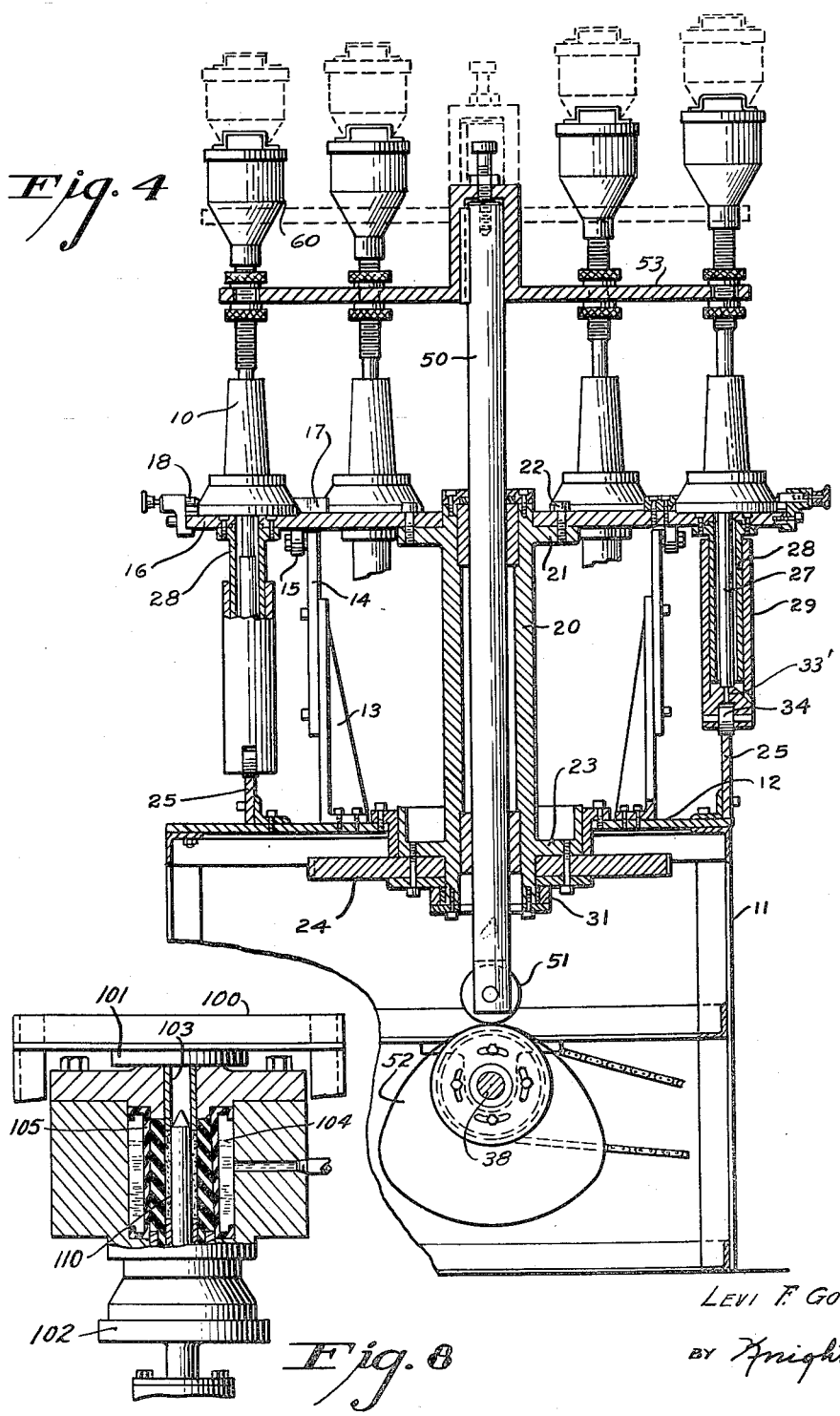
Inventor
LEVI F. GOODRICH
BY Knight & Fowler
Attorneys Nov. 7, 1950 L. F. GOODRICH 2,528,509
MOLD CHARGING APPARATUS
Filed March 7, 1947 3 Sheets-Sheet 3
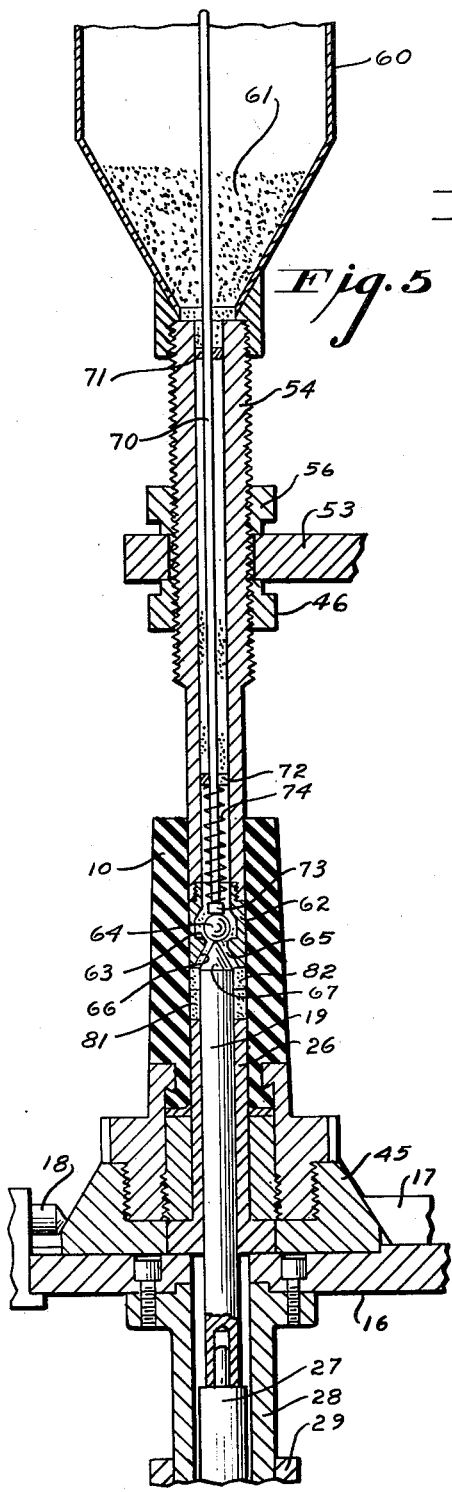
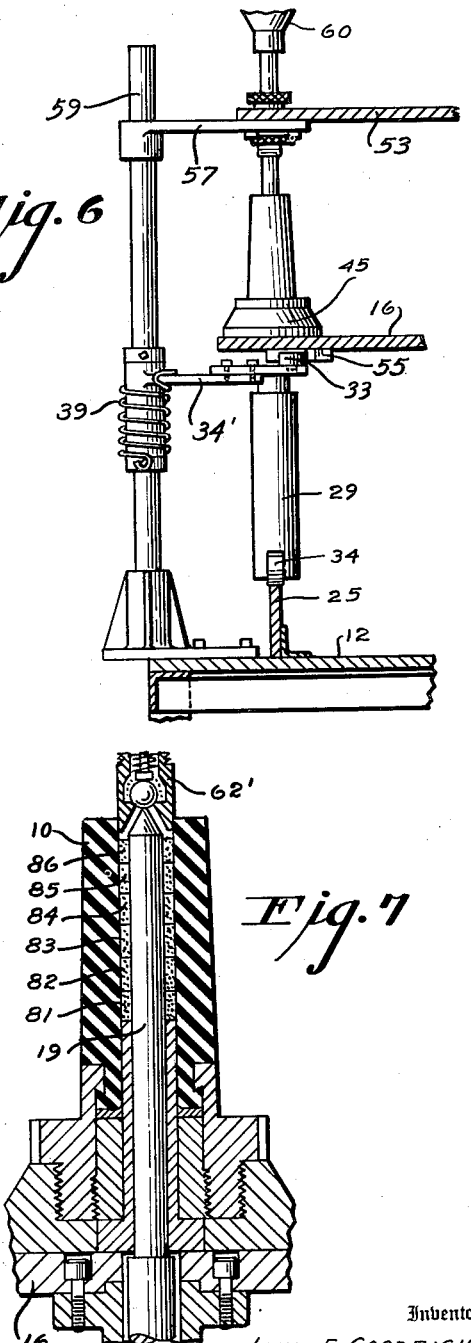
Inventor
LEVI F. GOODRICH
By Knight & Fowler
Attorneys Patented Nov. 7, 1950

2,528,509

UNITED STATES PATENT OFFICE 2,528,509

MOLD CHARGING APPARATUS

Levi F. Goodrich, Corning, N. Y., assignor to Corning Glass Works, Corning, N. Y., a corporation of New York Application March 7, 1947, Serial No. 733,232

7 Claims. (Cl. 25—103)

The present invention relates to the production of a vitreous body having an extended rod or tubular shape and varying progressively in composition along a longitudinal axis.

The invention is particularly applicable to the production of a joint or union between two materials differing materially in coefficient of expansion, for example, silica and glass.

Bodies for effecting such unions have heretofore been made in several ways. One ordinary expedient is to mix silica and glass in finely divided form into batches varying progressively in proportion, shaping the batches into disks or rings, sintering them and finally arranging them in a stack in proper order and vitrifying the whole into a single linear body having the necessary range of expansion characteristic for effecting a satisfactory seal between silica and glass bodies.

One object of the present invention is an apparatus by means of which the respective batches can be piled one upon another into a confined space of desired form and can thereafter be compressed to a self-supporting article and then vitrified. In this manner an intermixing of particles between adjoining batches is attained to assure a more compatible union there-between than results when such batches are separately sintered and then assembled and vitrified.

Another object is an apparatus for assembling a group of batches of finely divided materials varying progressively in proportion into a confined space of the desired form, which assembled group can then be compressed into a self-supporting article and finally vitrified into a body having the necessary characteristics for effecting a satisfactory seal between silica and glass bodies.

The foregoing objects are realized in an arrangement wherein a container is provided for each of the several finely divided mixtures required, and wherein a mold is supplied in succession with measured quantities of material from each of the containers, the accumulated mixtures being subsequently simultaneously compressed into a self-supporting article and then vitrified.

In the accompanying drawings, Fig. 1 is a plan view of a machine embodying the invention suitable for assembling in a mold the ingredients for formation into a vitreous body.

Fig. 4 is a sectional elevation taken generally on line 4—4 of Fig. 1.

Fig. 5 is an enlarged sectional elevation of one of six similar molds and mold charging units of the assembly taken generally along line 5—5 of Fig. 1, and shows a mold as having just received its second charge of materials.

Fig. 6 is an enlarged elevational view partly in section of a fragment of the machine illustrating resilient means associated with a turret of the machine for preventing free turning movement thereof from an indexed position.

Fig. 7 is a view of the lower portion of parts illustrated in Fig. 5 at the conclusion of mold charging.

Fig. 8 is a fragmentary view partly in section illustrating the manner of compressing a mold charge of finely divided material into a unitary self-supporting article.

Turret rotation mechanism

Referring in detail to the drawings, 11 is the frame of the mold charging machine, and 12 is a top plate therefor. Arranged on plate 12 are a number of supports, such as 13, to which are secured height adjustable turret roller supports, such as 14, provided with rollers, such as 15, carrying a turret 16. Turret 16 has a central aperture for receipt of a depending sleeve 20 having a flange 21 secured to the turret by cap screws, such as 22.

Figure 1:
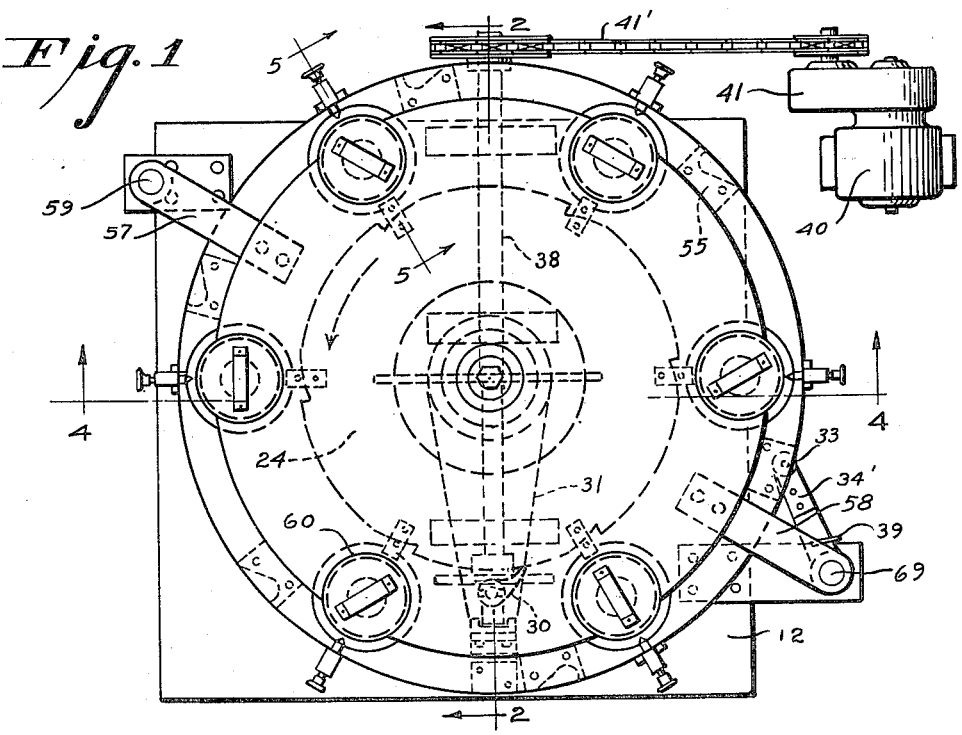
Figure 2:
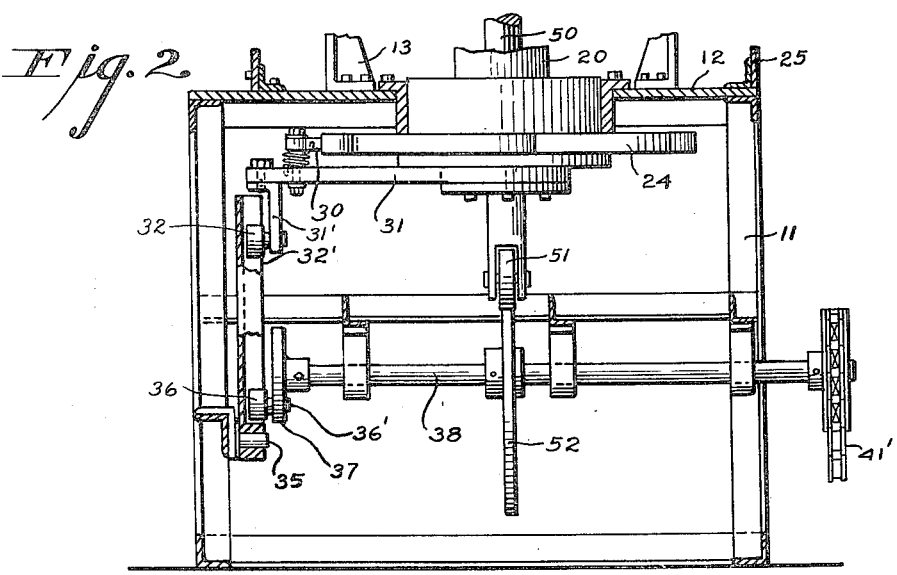
Fig. 2 is a sectional view of the lower portion of the machine, taken generally along line 2—2 of Fig. 1.

Sleeve 20 extends downward through an aperture in plate 12 and has a flange 23 to which is secured a ratchet wheel 24. A pawl 30 for driving wheel 24 in step-by-step fashion is carried by an actuating arm 31. Arm 31 at one end is pivoted about the lower end of sleeve 20 and at the other end is connected to an arm 31' carrying a roller 32 arranged in a channel member 32' pivoted at 35. Member 32' is oscillated by a roller 36 carried by a crank 36' driven by a disk 37 carried by a drive shaft 38 rotated by a motor 40 through the medium of a gear reducer 41 and a chain drive 41'. The drive is such that for each revolution of shaft 38 turret 16 is indexed one-sixth revolution, the distance between centers of six mold assemblies, such as assembly 10, arranged on table 12. At the completion of each indexing movement a roller 33 (Figs. 1 and 6) carried by an arm 34' under tension of a spring 39 enters a notch in a lug 55 on the under side of turret 16 to hold it in a position in which the molds such as 10 thereon are in vertical register with container valve housings, such as housing 62 (Fig. 5).

Passing through sleeve 20 is a shaft 50 carrying a roller 51 at its bottom end riding on a cam 52 keyed to shaft 38 and at its top end carrying a circular table 53 raised and lowered by cam 52 once for each revolution of the cam and held steady and level by oppositely disposed guide arms (Fig. 1) 57 and 58 vertically slidable on suitable guide posts 59 and 69.

Table 53 has a circular row of apertures therethrough in vertical register with molds, such as mold 10 of rubber, provided with a metal base 45 arranged on turret 16 between fixed and movable chuck jaws, such as jaws 17 and 18. Occupying each table aperture is a feed tube, such as tube 54 (Fig. 5), held rigid at a desired adjusted height therein by nuts such as nuts 46 and 56.

Each feed tube, such as 54, is at the top end threaded into the bottom of a funnel-bottomed container, such as container 60, for fluent granular particles 61, and at the bottom end has threaded thereon the valve housing 62 having a valve seat 63 formed therein on which a ball 64 normally rests. Below seat 63 housing 62 has a cavity 65 bounded by a bell shaped wall 66. An agitating pin 70 extends through the container 60 and through guides 71 and 72 tightly fitted within the bore of feed tube 54 and on through the tube bore with its head 73 resting on ball 64. A spring 74 is arranged about pin 70 and held slightly compressed between guide 72 and pinhead 73, to assist gravity in holding the pin against the ball at all times.

The configuration of the table actuating cam 52 and its rotary position on shaft 38 with respect to the position of crank 36' on ratchet drive disk 37 are such that cam 52 elevates table 53 and hence the valve housings, such as 62, clear of the molds, such as 10, during the final stage of movement of the ratchet drive preparatory to actual indexing the turret 16 and again lowers the valve housings into the molds during the initial stage of movement of the ratchet mechanism preparatory to a subsequent indexing movement of turret 16.

Figure 3:
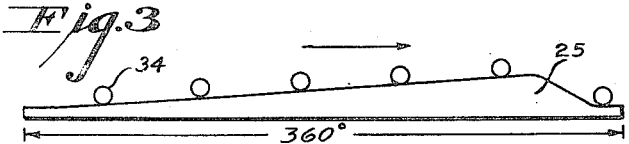
Fig. 3 is a straight line diagram of a cam track of the structure of Figs. 1 and 2 and of rollers adapted to travel on the track.

Projected up into the bore of each of the molds, such as 10, is a stationary sleeve 26, and projected up through this sleeve is a core 19 having a conical shaped top surface 67. Core 19 passes down through an aperture in turret 16 and rests on a push rod 27 surrounded by a guide sleeve 28 fixed to the under side of turret 16. Sleeve 28 is surrounded by a push sleeve 29 having a seat 33' on which rod 27 is supported and is itself supported by a roller 34 on a cam track 25 (Fig. 3) through the medium of which core 19 is maintained at a height within the mold 10, depending on its rotary position.

A mold receives its initial charge of material while it is indexed at that position where its core is in its lowest position. In Fig. 5, the relationship between mold 10 and container 60 is illustrated as it appears while receiving the second layer or charge 82 of material 61 above the first layer 81. Fig. 7 shows mold 10 shortly after receipt of the last one of the six charges 81—86 through valve housing 62'. As will be understood, the mixture of which charge 81 is composed for the most part is of particles of the material to which it is to be fused, glass for example, whereas layer 86 in such case is for the most part composed of silica particles adapting it to seal to silica. The layers 82—85 are composed of mixtures of glass and silica particles graded in steps from the first upward, the difference between the thermal coefficients of any two adjoining layers being less than sufficient to produce rupturing stresses at their junctures.

Mold charging

The filling operation begins as the table 53 is brought to its lowermost position by its cam 52. As this occurs the ball 64 encounters core 19 just before the downward movement of valve housing 62 is completed thereby lowering the valve seat 63 away from ball 64 to permit the flow of material 61 down the conical surface 67 of core 19 until the entire space below ball 64 becomes filled with material 61. Also, as the ball 64 moves off its seat, it raises agitating rod 70 against the force of gravity and the tension of spring 74 and thus stirs up or agitates the material 61 throughout the length of tube 54 to thus reduce danger of clogging therein.

As the table 53 is raised the ball 64 and rod 70 restore to their initial positions, as illustrated in Fig. 7. As the turret 16 is indexed, core 19 is raised sufficiently, through the action of cam 25, to provide space around the core for the material 61 formerly occupying the area around its tapered portion 67 and additional space for the charge to be received at the next indexed position of the mold. As will be understood, the vertical position of the respective containers, such as 60, and hence of the bottoms of their valve housings such as 62, all differ; that container having material used as the first portion of a mold charge being adjusted to bring the bottom of its valve housing in proper cooperative relation with the core 19 when the same is indexed over the lowest portion of cam 25 and the subsequent containers being set at progressively higher elevations. Housing 62', representing that of the container feeding the final layer 86 to a mold, accordingly is at a height to cooperate with the core 19 in the same manner as does the housing 62 with such core at the lower level illustrated in Fig. 5. Following receipt of the final mold charge 86 and the lifting of a housing, such as 62', clear of mold 10 an attendant replaces it with an empty mold assembly.

Pressing

A filled mold, such as 10, its supporting base 45, all parts carried thereby, and core 19, may be removed as a unit from turret 16 and placed in a hydraulic press 100 (Fig. 8) between two heads 101 and 102. From the head 101 a sleeve 103 depends into the mold to prevent linear expansion of the charge as it is laterally compressed into a unitary self-supporting article 110 by introduction of fluid into press cavity 104 having a rubber wall 105 surrounding the mold. After pressing, the article 110 may be readily removed from the mold by simply inverting the same.

Having thus described a preferred form of apparatus embodying the invention what is new and is desired to have protected by Letters Patent is:

I claim:

1. In combination a tubular mold, a rotatable turret supporting said mold with the axis of its bore vertical, a core projecting into the lower end of the bore of said mold, a sleeve projecting into the lower end of the mold bore surrounding the lower portion of said core, a support provided with a plurality of material containers arranged directly over the path of travel of said mold and each having a bottom tubulation with a valve in the bottom thereof normally maintaining the bore of the tubulation closed, means for rotating said turret in step-by-step fashion to successively index said mold into vertical register with each of said containers, means for elevating said core to a height within the mold determined by the desired volume of fill from the first of said containers brought in register therewith and for similarly elevating said core preceding the registration thereof with each of the remaining containers, and means for lowering said support while a container is in register with said mold and until its valve is opened by its engagement with said core and for thereafter returning said support to its initial position between indexing movements whereby the unoccupied portion of the mold cavity below the engaged portion of said core is temporarily accessible for the receipt of fluent material from the container at the time it is in register therewith.

2. In combination, a tubular mold arranged with the axis of its bore vertical, means providing an endless path of travel for said mold, a core projecting into the lower end of said mold bore, a sleeve within the mold bore surrounding the lower portion of said core, a support provided with a plurality of material containers arranged directly over the path of travel of said mold and each having a bottom tubulation with a valve in the bottom thereof normally maintaining the bore of the tubulation closed, means for successively indexing said mold into vertical register with each of said containers, means for elevating said core to such a height within the mold as to provide a desired space therearound corresponding to the desired volume of fill from the first container in register therewith, and means for lowering a container when in register with the mold to project the tubulation thereof into the mold and to open its valve by engagement with said core whereby the available portion of the mold cavity below the engaged portion of said core is made accessible for the receipt of fluent material from within its container, said means for elevating said core being adapted to successively move said core to a higher level within the mold cavity preceding the registration therewith of the second and subsequent of said containers.

3. In combination, a mold having a tubular cavity therethrough with its axis vertical, a core projecting into the bottom end of said mold cavity, a sleeve surrounding said core within the cavity, a filler tube projecting into the upper end of said cavity and having a normally closed valve adapted to be opened by engagement with said core, means for adjusting the height of said core above the sleeve to determine the volume of the cavity available for receipt of material from said filler tube, and means for bringing said core and valve into operative engagement.

4. The combination comprising a mold having a tubular bore with its axis vertical, a sleeve occupying a portion of the bore, a core passing through said sleeve and having its top end tapered to a point and terminating in the mold bore at a height above said sleeve, a support, a plurality of containers carried by said support each having a tubulation in the bottom thereof for introduction into the top end of the mold bore, a spring closed valve arranged at the bottom of each tubulation, means for lowering said support to bring the valve of a tubulation into engagement with said core to lift open said valve against the tension of its spring to open a passage for fluent material within its associated container down the inclined surfaces of said core and into the space between the top of said core and sleeve, said means for lowering said support also being adaptable to elevate it to its initial position whereby the valve is reclosed by said spring, means for moving said mold successively into register with the remaining containers prior to the respective lowering movements of said support, and core elevating means operated following each of its engagements with a valve to raise the core and thus make available a portion of the mold cavity for fill from a container whose tubulation is subsequently associated therewith.

5. In combination, a mold having a tubular bore, a container having a bottom tubulation fitting the top end of the bore of said mold, a valve housing attached to the bottom end of the tubulation, a ball seated on a bottom opening in said housing, an agitator rod resting on said ball and extending through said tubulation up into the container for a substantial distance, a sleeve extending up into the bore of said mold of a wall thickness substantially corresponding to the thickness of an object to be cast in said mold, a mold core closing the bore of said sleeve and extending thereabove a distance approximately corresponding to the height of that portion of an object to be cast from material supplied by said container and having its top end tapered to the configuration of an inverted cone, means for lowering and raising said container, the same being lowered to bring said ball into lifting engagement with the top of said core whereby the bottom opening in said housing is uncovered to afford a fluent material passage through the tubulation over the inclined surface of said core and into the surrounding mold cavity, said agitator rod being lifted by the ball to agitate fluent material within the tubulation and container to assist its down-flow, said means being operated to raise said container to permit the ball and rod to return to their original positions.

6. In a combination such as defined by claim 5, means for elevating said core within said mold whereby space is provided around the untapered portion of the core for fluent material remaining around the tapered portion thereof at the end of the filling operation.

7. In a mold charging apparatus, a turret, a mold having a tubular bore therethrough supported by said turret, a support arranged above said turret, a series of bottom tubulated containers attached to said support each arranged at a different height with respect to said support, a normally closed valve in the bottom of each tubulation, a sleeve lining the lower portion of the bore of said mold, a crown cam under the path of travel of said mold, a core supported on said cam passing through said sleeve and having its top end terminating within the mold above the top end of said sleeve and the contour of said cam being such that the space relationship between said core and the bottom of any tubulation with which it is in vertical register is substantially the same, means for indexing said turret to successively bring said mold into vertical register with the respective container tubulations, and means for lowering and raising said support between the indexing movements of said turret to the extent required to bring the valve of the tubulation in register with the mold into operative relation with the core thereof.

LEVI F. GOODRICH.

REFERENCES CITED

The following references are of record in the file of this patent:

UNITED STATES PATENTS

| Number | Name | Date |
|---|---|---|
| 1,085,973 | Conkling | Feb. 3, 1914 |
| 1,173,688 | Thomson | Feb. 29, 1916 |
| 2,197,562 | Reinker | Apr. 16, 1940 |